United States Patent

Garner et al.

[11] 4,030,424
[45] June 21, 1977

[54] RIGID RAILWAY CAR TRUCK

[75] Inventors: Gerald D. Garner, Florissant; James C. Hammonds; Jan D. Holt, both of St. Charles; Conway H. Melcher, Kirkwood, all of Mo.

[73] Assignee: ACF Industries, Incorporated, New York, N.Y.

[22] Filed: Apr. 29, 1975

[21] Appl. No.: 572,930

[52] U.S. Cl. .................. 105/182 R; 105/197 R; 105/199 CB; 105/202; 105/208
[51] Int. Cl.² .................. B61F 3/08; B61F 5/06; B61F 5/08; B61F 5/14
[58] Field of Search ............ 105/82, 182 R, 190 R, 105/199 R, 199 CB, 202, 224.1, 197 R, 208; 267/4; 308/138

[56] References Cited
UNITED STATES PATENTS

| | | | |
|---|---|---|---|
| 579,311 | 3/1897 | Anderson | 105/202 |
| 630,358 | 8/1899 | King | 308/138 |
| 1,810,718 | 6/1931 | Lord | 105/199 CB |
| 1,821,296 | 9/1931 | Drenning | 105/190 R |
| 1,994,304 | 3/1935 | Devlin | 105/202 X |
| 2,168,293 | 8/1939 | Kiesel, Jr. | 105/182 R |
| 2,216,715 | 10/1940 | Ledwinka | 105/82 X |
| 2,233,540 | 3/1941 | Latshaw | 105/224.1 |
| 2,267,153 | 12/1941 | Holland | 267/4 |
| 2,513,266 | 6/1950 | Laukus | 105/182 R |
| 3,570,409 | 3/1971 | Oelkers | 105/182 R |

FOREIGN PATENTS OR APPLICATIONS

| | | | |
|---|---|---|---|
| 545,995 | 3/1956 | Belgium | 105/202 |
| 1,213,468 | 3/1966 | Germany | 105/199 R |

*Primary Examiner*—L. J. Paperner
*Assistant Examiner*—Howard Beltran
*Attorney, Agent, or Firm*—Henry W. Cummings

[57] ABSTRACT

In accordance with the present invention a railway car truck is provided including a pair of transversely spaced side frames and a transom which is attached solely to the side frames with a rigid connection to define an integral H frame to maintain the side frames parallel and resist truck hunting. The transom has a cross section which provides torsional flexibility which allows the side frames to rock relative to one another. Above the transom a bolster is provided which extends transversely between the side frames and rests upon spring assemblies mounted in openings in the side frames. The weight of the car body is by car body bearing assemblies mounted on the bolster above the spring assemblies. A bolster center bearing is provided which engages the car body and transmits substantially all horizontal loads from the car body through the bolster to the side frames. The spring assemblies may include two components in which one component has a resultant low spring rate which at all times in traversing ordinary track transmits the weight of the car body to the side frames, and another component having a resultant high spring rate which functions when rough track is traversed to transmit the weight of the car body to the side frames from where the weight is transmitted to the wheels to maintain the wheels on the track while the rough track is being traversed.

21 Claims, 39 Drawing Figures

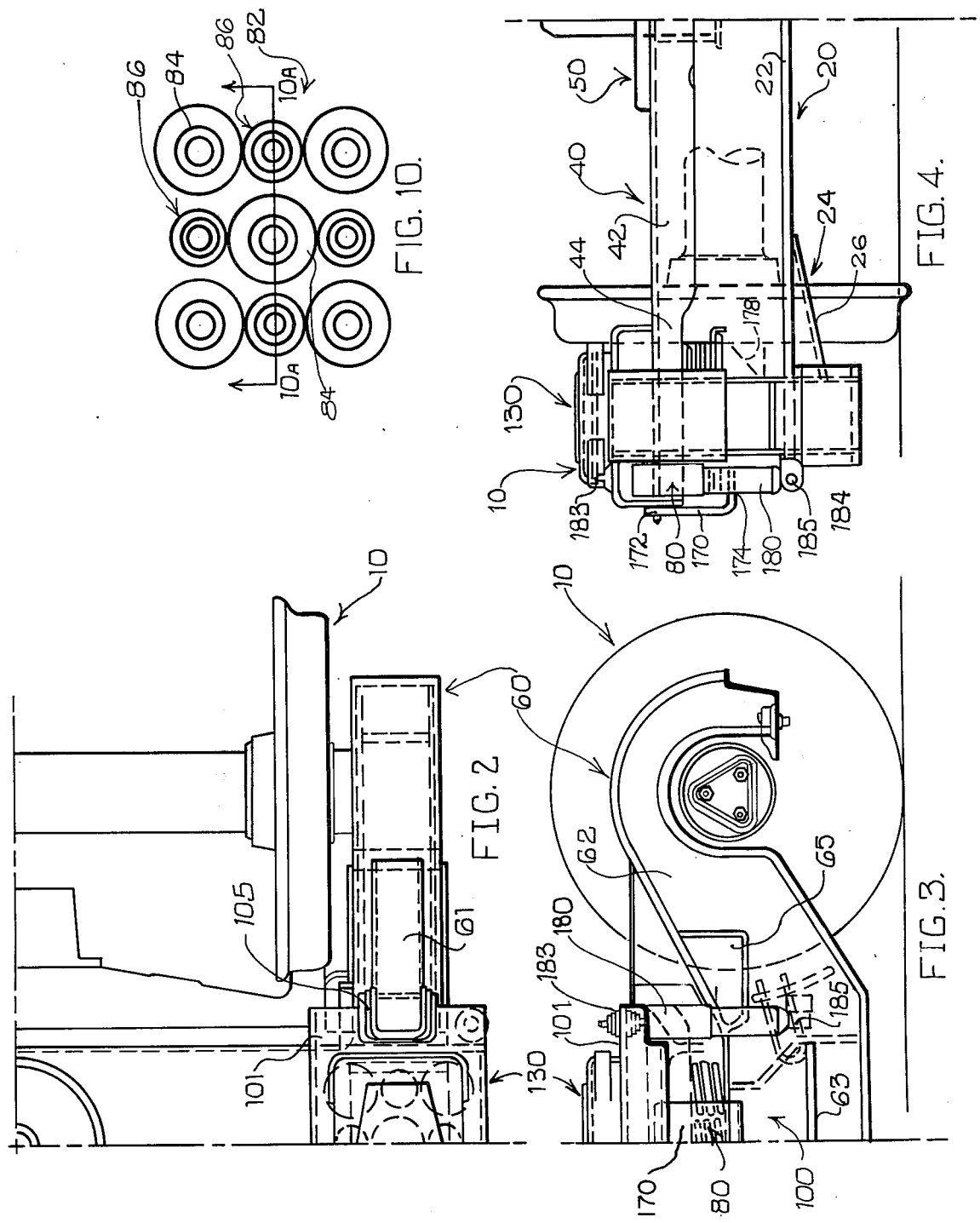

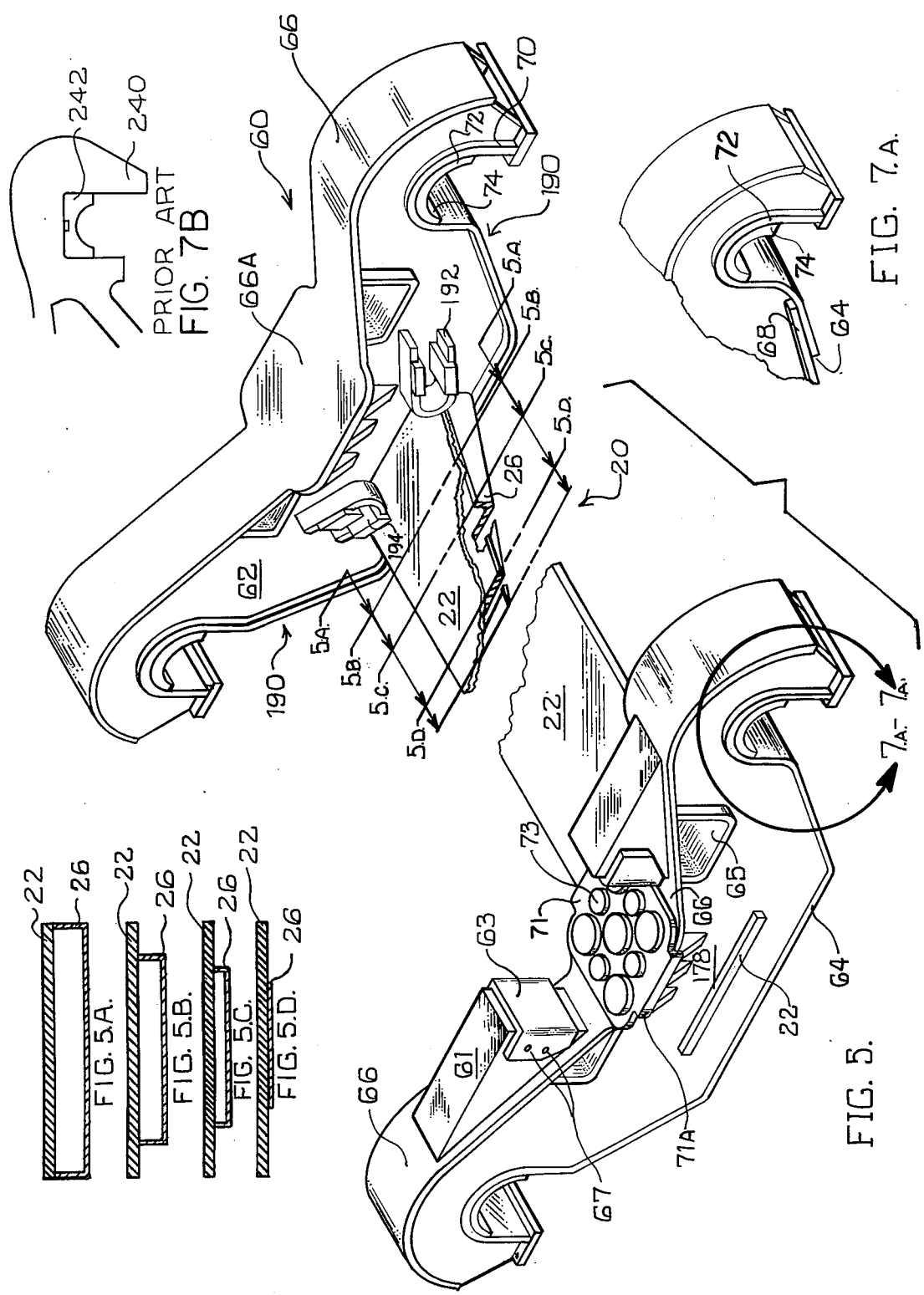

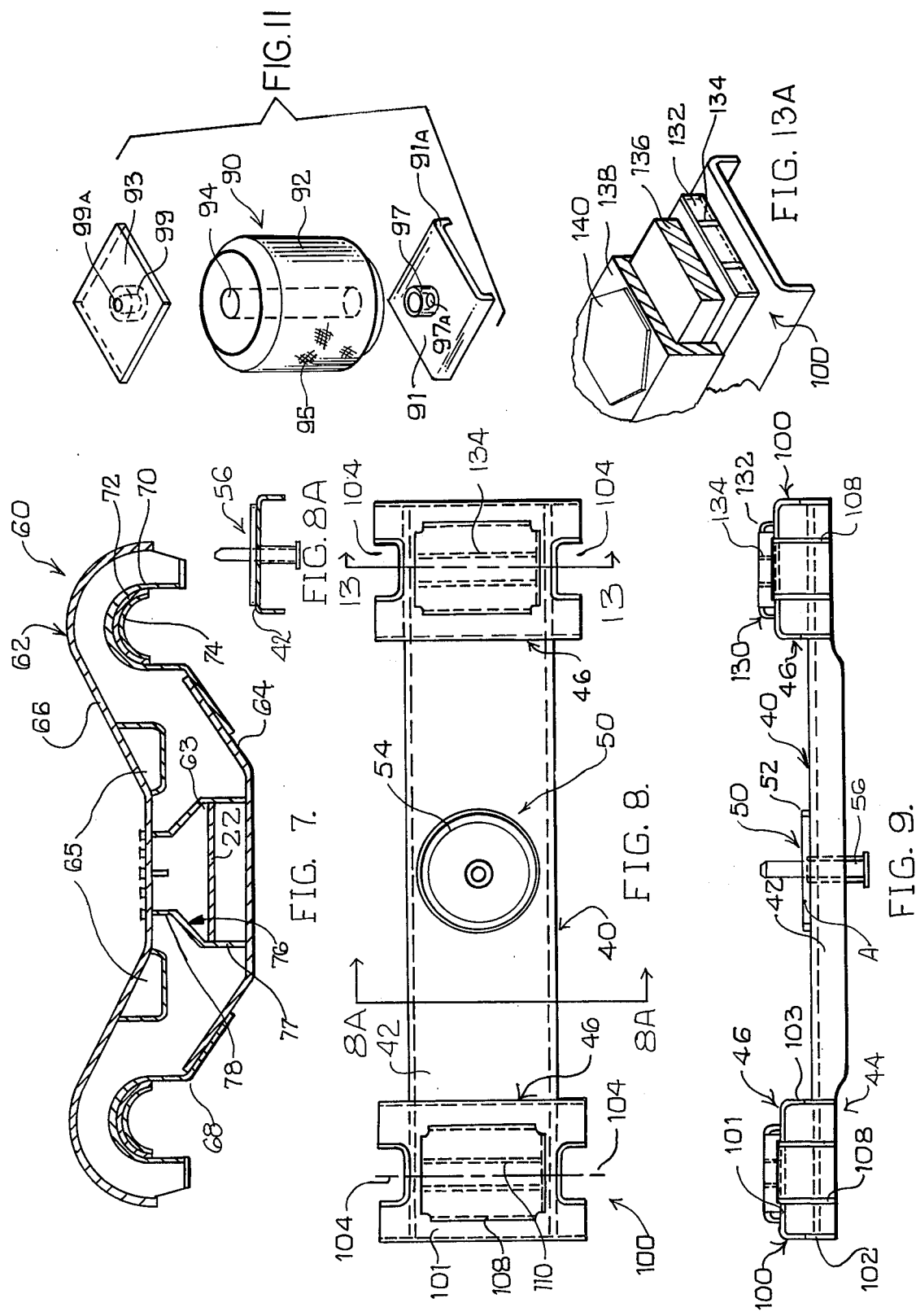

RIGID RAILWAY CAR TRUCK

BACKGROUND OF THE INVENTION

In application Ser. No. 447,823 filed Mar. 4, 1974, now abandoned and application Ser. No. 519,976 filed Nov. 1, 1974, a continuation-in-part thereof, assigned to the same assignee as the present application, a railway car truck is disclosed having a rigid H frame which is sprung at the journal boxes with resilient devices. The weight of the vehicle body is taken generally at the center of the side frames. A transverse member is provided which is torsionally flexible and in which the shear center is preferably spaced from the neutral axis of the transverse member so that longitudinal loads taken by the center connection between the vehicle body and the transverse member will not introduce substantial torsional loads into the transverse member.

This truck does demonstrate improved riding characteristics including reduced hunting, reduced rock and roll, and improved rough track negotiability (it maintains the wheels on the track a greater percent of the time over rough track).

However, this truck is significantly more expensive than conventional trucks commercially available.

SUMMARY OF THE INVENTION

The primary object of the present invention is to provide a railway truck having improved riding characteristics including avoidance of hunting at speeds normally used by U.S. freight trains, reduced rock and roll and improved rough track negotiability, at a cost which is competitive with the standard available commercially available railway freight car trucks.

Another object of the present invention is to provide a truck which may be fabricated from formed plates, or from castings, or from both, depending upon the relative availability of castings and plate.

In accordance with the present invention a railway car truck is provided including a pair of transversely spaced side frames and a transom which is attached solely to the side frames with a rigid connection to define an integral H frame which maintains the side frames parallel and resists hunting. The transom has a cross section which provides torsional flexibility to allow the side frames to rock relative to one another particularly when rough track is traversed. Above the transom a bolster is provided extending transversely between the side frames resting upon spring assemblies mounted in openings in the side frames. The weight of the car body is taken on car body bearing assemblies located on opposite sides of the bolster. The upper surface of the car body bearing assembly is provided with a low friction material, allowing the truck to rotate with respect to the car body. A bolster center bearing is provided which engages the car body and transmits horizontal loads from the car body through the bolster to the side frames. The spring assembly may include dual components in which one component has a resultant low spring rate which at all times in transversing ordinary track transmits the weight of the car body to the side frames from where it is transmitted to the wheels, and another component which has a resultant high spring rate which functions when rough track is traversed to transmit the weight of the car body to the said frames from where it is transmittted to the wheels to maintain the wheels on the track as rough track is traversed. The spring assembly preferably cushions both vertical and transverse movement of said bolster. The side frames are preferably provided with a elastomeric journal pads above the area where the side frames rock upon the journal bearings. The spring assemblies are preferably provided with dampening devices to damp oscillation of the spring assembly which together with the spring assemblies function to control truck rock and roll.

THE DRAWINGS

FIG. 2 is a partial plan of the truck shown in FIG. 1;

FIG. 3 is a partial side elevational view of the truck shown in FIG. 1;

FIG. 4 is a partial end view of the truck shown in FIG. 1;

FIG. 5 is a perspective view of the truck of the present invention with the bolster, spring assembly and body bearing assembly removed illustrating the transom, side frames, spring mounting plate and brake mounting assembly;

FIG. 5A is a sectional view along the lines 5A—5A in FIG. 5 illustrating the cross section of the transom reinforcement;

FIG. 5B is a sectional view along the lines 5B—5B in FIG. 5 illustrating another cross secion of the transom reinforcement;

FIG. 5C is a sectional view along the lines 5C—5C in FIG. 5 illustrating another cross section of the transom reinforcement;

FIG. 5D is a sectional view along the lines 5D—5D in FIG. 5 illustrating another cross section of the transom reinforcement;

FIG. 7 is a detailed sectional view of the side frames to be utilized in accordance with the truck of the present invention;

FIG. 7A is an enlarged view of the side frames above the journal bearings illustrating a lapped construction and the journal pad of the truck of the present invention;

FIG. 7B is a side view illustrating a prior art journal box adapter utilized on many conventional trucks;

FIG. 8 is a plan view of the bolster assembly of the present invention;

FIG. 8A is a sectional view along the lines 8A—8A in FIG. 8;

FIG. 9 is a side elevational view of the bolster assembly of the present invention;

FIG. 10 is a detailed view of one embodiment of a coil spring assembly which may be utilized in the present invention;

FIG. 11 is an exploded view of the elastomeric spring assembly which may be utilized in accordance with the present invention;

FIG. 13A is a perspective view of the car body bearing assembly;

DETAILED DESCRIPTION

Figure 16:
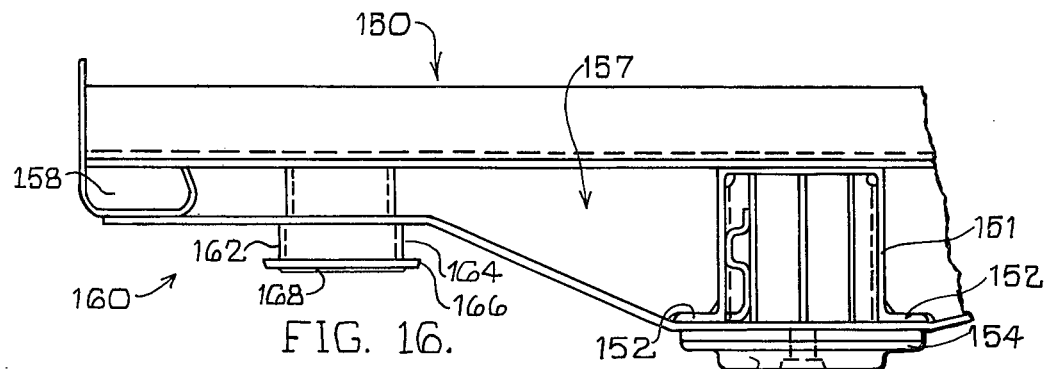
FIG. 16 is a transverse sectional view through a portion of a railway car body which may be utilized in cooperation with the truck of the present invention.

The rectangular truck of the present invention is indicated generally in the drawings at 10. The truck comprises a transom indicated generally at 20, a bolster indicated generally at 40, a pair of side frame assemblies indicated generally at 60, a spring assembly indicated generally at 80, preferably having dampening devices 180, a spring receiving assembly 100 in ghe bolster and a car body bearing assembly indicated generally at 130. The car body is preferably provided with a cooperating car body side bearing assembly indicated generally at 160 (FIG. 16).

The transom 20 (FIGS. 4 and 5) preferably comprises a plate 22 extending between the side frames 62. An opening 63 may be provided in the side frames and plate 22 preferably passes into this opening and is integrally affixed to the side frames, by welding, riveting or with mechanical fasteners, providing an integral H frame. If desired, transom reinforcement means indicated generally at 24 may be provided, for example, comprising diagonal reinforcement plates 26 welded to side frames 62 and plate 22.

Figure 18:
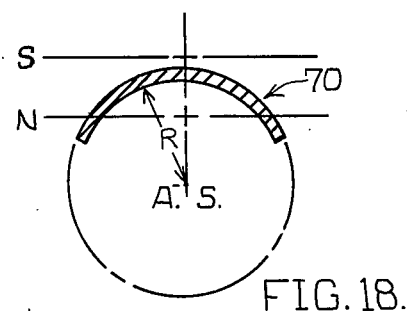
FIG. 18 is a side view of a circular cross section sector transverse member.
Figure 19:
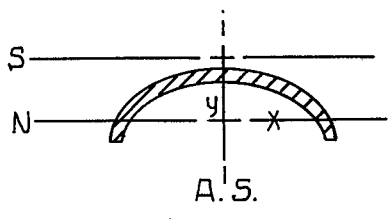
FIG. 19 is a view of a transverse member of an elliptical sector cross section.
Figure 20:
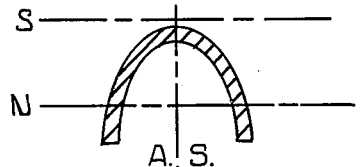
FIG. 20 is a view of a transverse member having a parabolic sector cross section.
Figure 22:
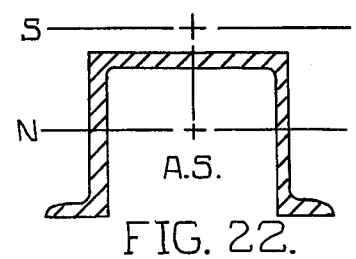
FIG. 22 is a view of a transverse member having an outwardly extending flanged channel section.
Figure 22A:
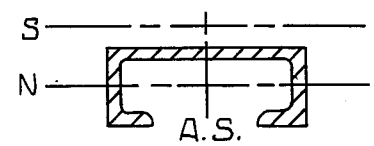
FIG. 22A is a view of a transverse member having an inwardly extending flanged channel section.
Figure 23:
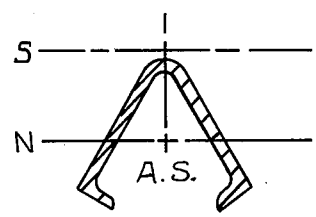
FIG. 23 is a view of a transverse member having a triangular apex section.
Figure 24:
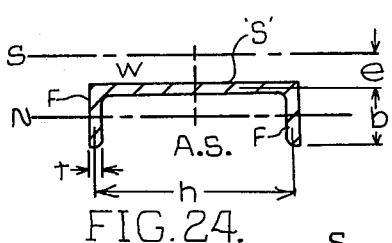
FIG. 24 is a view of a transverse member having a channel section.
Figure 21:
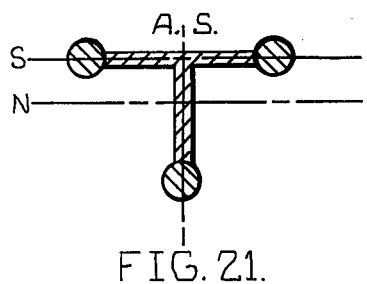
FIG. 21 is a view of a transverse member having a rod reinforced T section.
Figure 25:
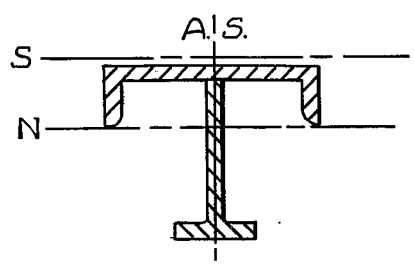
FIG. 25 is a combination channel and inverted T or I section.

A particularly important feature of the present invention is the transom 20. It will be apparent that the two side frames 60 and the transom 20 define an integral H frame in plan. This construction tends to retain its H configuration at all times causing the axles to remain parallel and square with the truck frame at all times. The rigid H design tends to reduce wheel wear and inhibits hunting. It raises the speed at which the unstable hunting condition occurs to above those speeds commonly used in the railroad freight trains. While this H frame is relatively rigid in terms of withstanding bending moments applied longitudinally to the side frames (commonly called skewing forces), the transom does have torsional flexibility to permit rocking movement of one side frame with respect to the other side frame. Thus the transom allows rotation of the side frames relative to one another while retaining the H frame configuration. Relatively free rotation of the side frames about an axis transverse to the truck allows the truck to distribute the car weight generally evenly to each wheel as the wheels roll over uneven track (commonly called equalization). Preferably the reduction in static wheel load is less than 15% for a one inch drop of one wheel on an empty car fitted with the truck of the present invention. Preferably, the approximate torsional flexibility is up to about 100,000 inch pounds of moment per degree. This torsional flexibility may be obtained in an open cross section. Thus the torsionally flexible transom may comprise a generally open section in order to provide bending strength in combination with torsional flexibility. Thus the open section may be curved, for example, a segment of circular (FIG. 18) or elliptical (FIG. 19), or parabolic (FIG. 20). The open section also may be non-curved, for example, channel-shaped, as shown in FIG. 24, triangular apex (FIG. 23), outward flanged channel section (FIG. 22), inward flanged channel (FIG. 22A), I-beam or flanged I-beam (FIG. 25), and rod reinforced T section (FIG. 21). By way of example, if channel-shaped, the horizontal to vertical dimension ratio should be preferably from 1 to 3. If circular, the radius of curvature is preferably 10 to 15 inches. If elliptical, the range of X/Y dimension ratio is preferably 2.5 to 4. Torsional flexibility can also be obtained in a rectangular cross section which may be viewed as an open cross section (a circular segment having an infinite radius).

The plate 22 most preferably comprises a cross section which provides torsional flexibility and is inexpensive, such as a rectangle, channel, semicircle or an I-beam.

As shown in FIGS. 5–5D, the connection of the plate 22 to the side frames is preferably reinforced with a formed or fabricated member 26 which comprises an enclosed section which decreases in cross-sectional area toward the center line of the truck. The reinforcing member 26 acts to make a smooth transition from a flexible transom cross section to a relatively rigid cross section in order to reduce the stress concentration at the connection of the transom to the side frames.

Figure 6A:
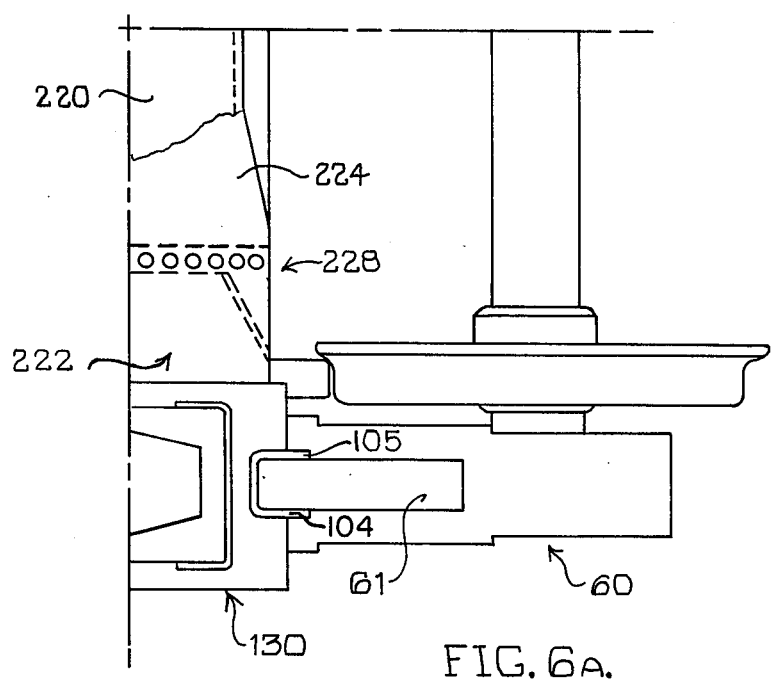
FIG. 6A is a plan view of the embodiment of the present invention illustrated in FIG. 6.
Figure 6:
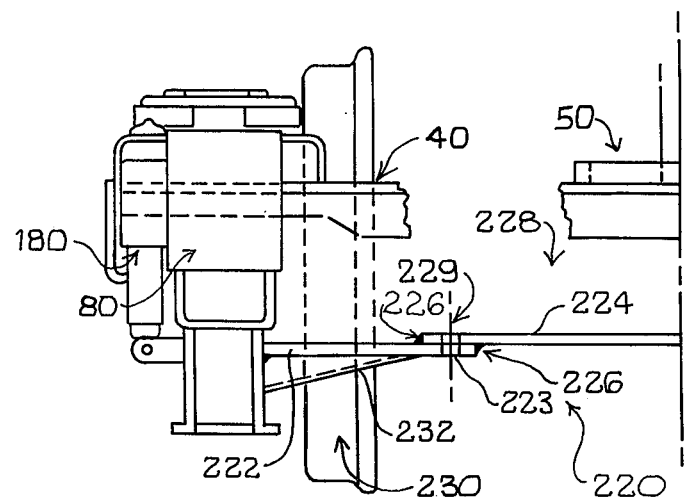
FIG. 6 is a sectional view of the present invention illustrating a modified transom arrangement.

Alternatively, as shown in FIGS. 6 and 6A the transom indicated generally at 220 may comprise a fastening portion 222 which is integrally affixed to the side frames, preferably by welding, and transom portion 224 which spans the majority of the distance between the side frames (below bolster 40). Portions 222 and 224 may then be rendered integral by means of welding as indicated at 226 and/or by means of mechanical fasteners indicated generally at 228 passing through openings 223 and 229 respectively, in transom portions 222 and 224. A wide variety of mechanical fasteners may be utilized, including nut and bolt assemblies, rivets, huck bolts, etc.

As described above, the transom is preferably reinforced as indicated at 230, preferably by means of a converging section 232 which is integrally fixed, preferably by welding to the side frames and to fastening portion 222.

Bolster assembly 40 comprises a transverse bolster 42 preferably having an open section a pair of side members and a cross member defining a hollow portion having an open bottom which may be any of the open sections described hereinabove for the transom 20 shown in FIGS. 18–25. As shown in FIG. 8A bolster 42 is illustrated in the drawings as being channel-shaped. The vertical thickness of the bolster is preferably reduced as indicated at 44. Portion 44 then rests upon spring assembly 80.

Since the car body is supported at the side frames rather than at the center plate, the bolster may be an uncomplicated section, such as the simple channel section illustrated. The reduction in cost of the bolster in an important feature of the present invention.

Bolster assembly 40 is provided with a center bearing assembly indicated generally at 50. Center bearing assembly 50 may comprise a center ring 52, and a center ring liner 54 may be provided, if desired. The center bearing assembly 50 also preferably commprises a center bearing retainer 56 FIG. 9 at about the midportion thereof for the car body center plate.

As described in said Ser. No. 447,823 and Ser. No. 519,976, it is preferred that the shear center of the bolster be spaced from the neutral axis of the bolster a distance sufficient that longitudinal loads taken by the center bearing 50 will not induce substantial torsional loads into the bolster. The shear center (S in FIGS. 18–25) of the open section is spaced from the neutral axis (N in the drawings) of the open section a distance sufficient to allow the attachment of an interface between the car body and truck of a sufficient interface area to resist wear and transmit longitudinal loads to the transverse member without inducing substantial torsional loads. Preferably, the shear center is located on the axis of symmetry (A.S. in the drawings). Thus, for example, if it be assumed in FIG. 18, that the circular segment is a semicircle, the shear center S is spaced from the neutral axis N a distance of $4r/\pi$ for a circular segment of radius $r$. For a channel section (FIG. 24) the distance from surface S is equal to $h^2b^2 t/4I$ where $h$ is the distance between the centers of the flanges F, $b$ is the distance from flange end to the center of longitudinal web W, $t$ is the flange thickness and $I$ is the moment of inertia about the neutral axis N.

The equation for the shear center for the other shapes shown is known in the art, see for example, page 110 of Advance Mechanics of Materials by Seely & Smith; Copyright 1952, Library of Congress No. 52-11034, John & Wiley & sons, Inc. The other shapes shown may be appropriately dimensioned so that the shear center will fall outside the neutral axis (except for the rod reinforced T section shown in FIG. 21).

The vertical interface area of center bearing 50 between the car body and truck (A in FIG. 9) required for 70 to 125 ton railway trucks is approximately 48 to 60 square inches (14 inches and 16 inches center plate, respectively X 1⅛ inch vertical surface). Thus standard center plates may be used even when the shear center is spaced from the neutral axis and is located on the axis of symmetry.

Furthermore, the cross section of the bolster member in accordance with the present invention may vary. For example, the channel is reduced in height as shown at 44 in FIGS. 4 and 9. Even with a varying cross section, if desired, the shear center may be located outside the section, and, if desired, on the axis of symmetry, as shown in FIGS. 18–25.

As shown particularly in FIGS. 5, 7, and 7A, the side frame assembly 60 comprises side frames 62 which comprise a lower cover plate 64 and a top cover plate 66. The lower cover plate 64 may be a single formed piece or as illustrated in FIG. 5 it may be a spliced arrangement as indicated at 68 in FIGS. 7 and 7A. Lower cover plate 64 has a journal box engagement portion 70 which is generally semicircular. An elastomeric journal pad 72 and an optional retainer therefor 74 may be provided in this journal box engagement portion.

This arrangement has several advantages. In the first place the usual journal box adapter 242 in FIG. 7B mounted between the journal bearings (not shown) and the side frames 240 on conventional trucks can be eliminated from the journal box assembly with this arrangement. Thus a cost reduction can be obtained.

The journal pad tends to reduce the shock load to the side frames from the wheels which reduces the stress levels in the side frames allowing the lighter structure and tends to reduce any tendency of fatigue failure of this welded member. Furthermore, the flexibility of the rubber allows movement of the axle, both laterally and longitudinally which improves the dynamic characteristics of the truck. By shaping the rubber properly, selected dynamic characteristics can be obtained to further enhance the stability of the truck. For example, lateral wheel flange loads are reduced by the resilience of the rubber.

In FIG. 7, reinforcing structure indicated generally at 76 is preferably provided between lower cover plate 64 and the upper cover plate 66. This may comprise longitudinally spaced vertical ribs 77 preferably converging at the upper portion thereof as indicated at 78 below the points where they are welded to cover plate 66. Transom plate 22 preferably passes through opening 63 in the side frames 62 and preferably is welded to reinforcing ribs 77 as shown.

Spaced openings 65 are provided in the side frame to enable operators to observe the condition of the brake assembly indicated generally at 190, particularly the brake shoes (not shown).

Side frame assembly 60 is also provided with a pair of side frame extensions 61 (FIGS. 5 and 6A) extending from each journal box engagement portion longitudinally up to about the midportion of the side frames. Low friction bearing material 63 is mounted upon extension 61 with appropriate fasteners 67 (FIG. 5).

Top cover plate 66 has an increased transverse portion 66a between side frame extensions 61 to support resilient spring assembly 80. Between extensions 61 a spring mounting plate 71 is mounted upon the portion 66a. Plate 71 is provided with a plurality of 73 adapted to support members of spring assembly 80.

Figure 10A:
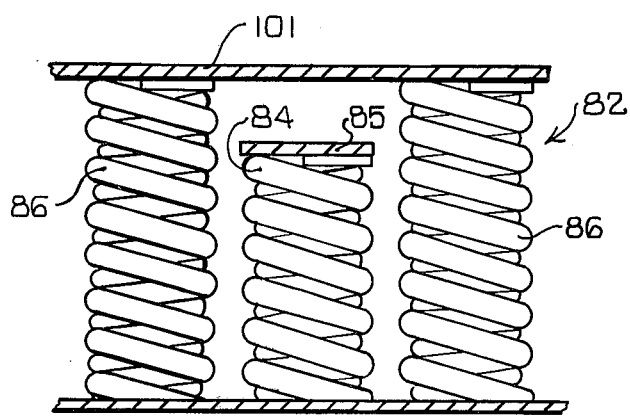
FIG. 10A is a sectional view along the lines 10A—10A in FIG. 10 illustrating a coil non-linear spring assembly.
Figure 12:
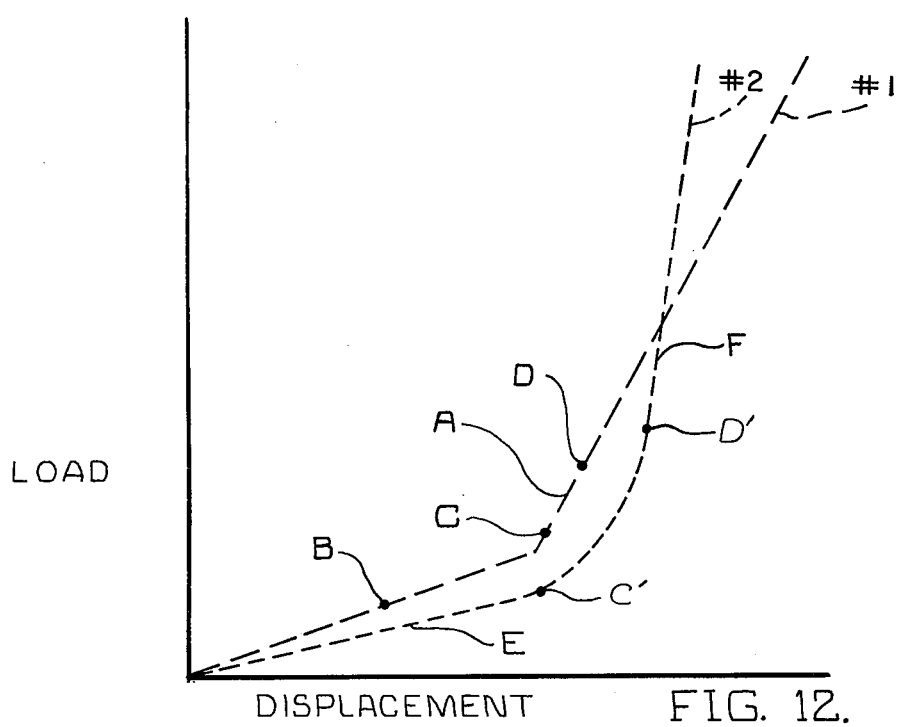
FIG. 12 is a plot of force applied to the resilient assembly against distance of deflection illustrating the non-linearity of the spring assemblies preferred in accordance with the present invention.

Spring assembly 80 is preferably of the dual component non-linear type in which one component of the spring assembly has a resultant low spring rate and deflects considerably with applied force, and in which a second component has a resultant high spring rate and deflects much less with applied force. For example, as illustrated in FIGS. 10 and 10A, one type of spring assembly is a spring arrangement indicated generally at 82. The spring arrangement comprises a plurality of first coil springs 84 and a plurality of second coil springs 86. First coil springs 84 comprise relatively hard springs with a resultant high spring rate, and deflect relatively little with applied force. Seconnd coil springs 86 have a resultant low spring rate, and deflect considerably with applied force. The coil springs 84 and 86 are utilized to cushion the truck when the car body is empty (point C, FIG. 12) or full of lading (point D).

Thus in the usual situation bolster spring receiving member 101 FIGS. 2, 9, and 10A is bottomed out on first spring wear plate 85 and springs 84 and 86 are acting in parallel, and constitute the first component (Portion A of Curve No. 1). The only time the situation illustrated in FIG. 10A occurs is when the truck goes over an irregularity in the track. When the truck hits an irregularity in the track, so that one or more complete spring assemblies shown generally at 82 are unloaded below static load, spring 84 is rendered inactive and second springs 86 continue to act in parallel on portion B of Curve No. 1 in FIG. 12. Under the unloaded condition, the springs 86 constitute the suspension which serves to transmit the vertical load of the vehicle body down through spring mounting plate 71, through the side frames 60 to the wheels. Thus the weight of the vehicle body is maintained on all wheels during rough track and the chance of derailment is substantially reduced or avoided compared to the use of a standard linear spring arrangement. After the rough track has been traversed by the truck, spring receiving member 101 again bottoms out on spring seat 85, and the springs act according to portion A of Curve No. 1.

Figure 10D:
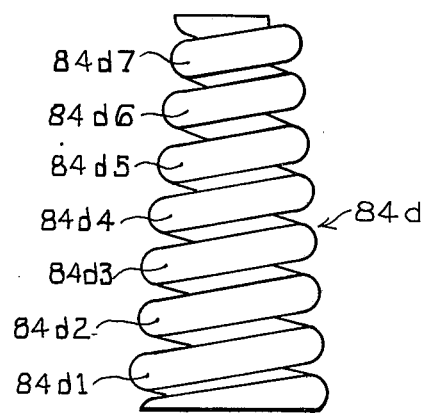
FIG. 10D is a view of a coil spring exhibiting non-linearity due to variations in coil diameter.
Figure 10B:
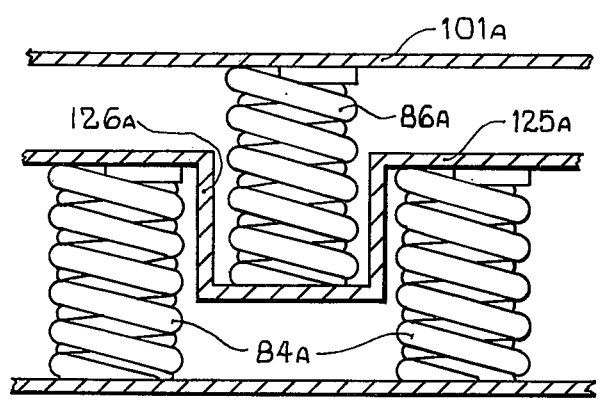
FIG. 10B is a view similar to FIG. 10A illustrating a modified coil non-linear spring assembly.

An alternative embodiment is illustrated in FIG. 10B wherein a bolster mounting member 101A is provided and a spring mounting member 125A is provided. First springs 84A mounted on opposite sides thereof have resultant high spring rates. Second springs 86A are mounted in cup-like supports 126A defined by the spring mounting member 125A. The springs 86A have a resultant generally low spring rate. In the ordinary situation bolster mounting member 101A is bottomed out on spring mounting plate 125A and springs 86A are inactive, but carrying a constant load. First springs 84A support the car body in unloaded or loaded conditions (first spring component). However, when rough track is traversed by the truck, the weight of the vehicle body is transmitted down to the wheels by means of second springs 86A acting in series with springs 84A (second spring component). The embodiment shown in FIG. 10B has the advantage that the minimum spring height is achieved considering the spring rates of the respective first and second springs, the outside diameter of the springs and the amount of travel. The foregoing are examples of linear springs used to achieve non-linearity by using more than one spring. The respective first and second spring components may be made up of one or a plurality of springs having the same or different spring rates.

Figure 10C:
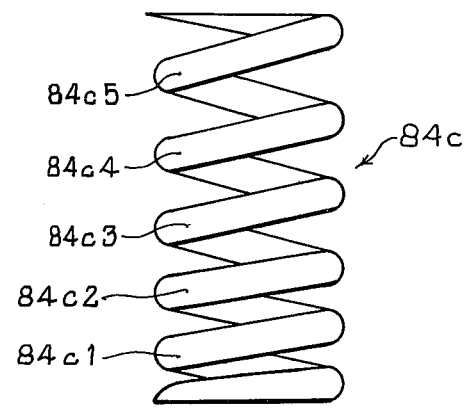
FIG. 10C is a view of a single spring exhibiting non-linearity due to to variations in coil spacing.

In accordance with another embodiment of the present invention, the coils of a single may be used to achieve non-linearity. Thus as shown in FIG. 10C, the spring indicated generally at 84C in FIG. 10C comprises a series of coils $84C_1 - 84C_5$, each of which are spaced apart a greater distance than the lower coils. As greater load is applied to the springs, the coils $84C_1$, $84C_2$ and $84C_3$, etc. gradually bottom out as a greater load is applied. Thus when all coils are active the assembly has a low spring rate and considerable deflection per pound. The coils are in series with each other. However, when the lower springs have bottomed out, this results in a higher spring rate and less deflection per pound. Thus a single spring of the type shown in FIG. 10C may substitute for one of the dual spring assemblies shown in FIGS. 10A and 10B to achieve non-linearity.

In still another embodiment a non-linear spring shown in FIG. 10D, the coil diameter of the coils $84D_1 - 84D_7$ decreases upwardly. In this embodiment when all springs are operative, large diameter coils are in series with the small diameter coils. For example, the large diameter coils may have a low spring rate and bottom out first with applied load, leaving the smaller diameter coils with the higher spring rate operative. There exists a wide variety of non-linear spring designs utilizing the variable spring and variable diameters alone or in combination which may be used in the spring assembly of the present invention by those skilled in the art.

In use in the embodiment shown in FIGS. 10C and/or 10D during empty; partial load or full load some of the springs having a low spring rate are bottomed out. However, upon the truck traversing rough track, most or all of the coils including those having a low spring rate become active to transmit the load of the vehicle body down to the car wheels and reduce or avoid the tendency of truck derailment.

Instead of the coil spring arrangements illustrated in FIGS. 10-10D, a rubber spring arrangement illustrated in FIG. 11 may be utilized. In this embodiment the elastomeric spring assembly indicated generally at 90 may comprise a generally cylindrical elastomeric spring 92 having a center opening therein 94 and having a wrapping or covering 95. Elastomeric spring 92 is also of the non-linear type. As shown by Curve No. 2 in FIG. 12, this spring is relatively soft at initial deflection with a low spring rate (Portion E) but becomes progressively stiffer with a higher spring rate as the spring is further deflected (Portion F). Point C' indicates when the car body is empty and point D' when the car body is fully loaded. Furthermore, the elastomeric springs provide at least some damping of the spring assembly which tends to reduce rock and roll, in parallel with the damping devices.

Assembly 90 also preferably includes bottom and top mounting plates 91 and 93, each having posts thereon 97 and 99 to fit in the opening 94 in the elastomeric spring 92. Preferably openings 97a and 99a are provided in posts 97 and 99 for circulation of air through the spring so that during oscillations of the spring heat generated may be efficiently removed.

It will be apparent that in the case of the coil spring assembly 82 spring mounting plates 71 with a plurality of retainers 73 take the place of plates 91 with single spring retainer 97 in the case of the elastomeric spring assembly 90. However, both bottom cover plates 71 and 91 are provided with retainer flaps 71a (FIG. 5) and 91a (FIG. 11) to maintain the respective plates in engagement with the side frame top plate portion 66a.

A bolster spring receiving assembly is indicated in the drawings generally at 100. Assembly 100 is made integral with bolster 42. For example, as shown in FIGS. 8 and 9, assembly 100 may be mounted within openings 46 in bolster assembly 40. Assembly 100 may comprise a cover 101 having spaced sides 102 and 103 welded to bolster portion 44. Cover 101 has openings on opposite ends 104 spaced from side frame extensions 61 to provide clearance therebetween 105, FIG. 6A. Longitudinal ribs 108 (FIG. 9) may be provided for support and to facilitate holding coil spring assembly 82 in place.

Figure 14:
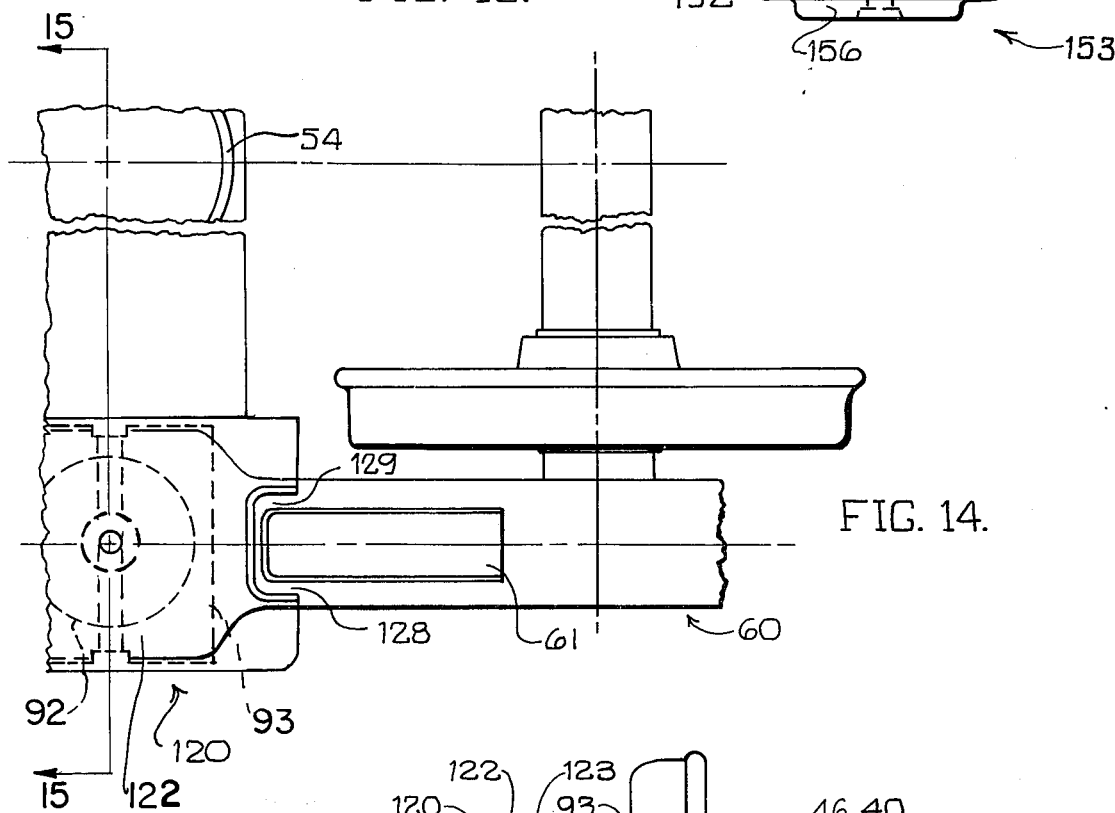
FIG. 14 is a partial plan view of a cover assembly to be utilized with the elastomeric spring assembly in the present invention with the car body bearing assembly removed for clarity.
Figure 15:
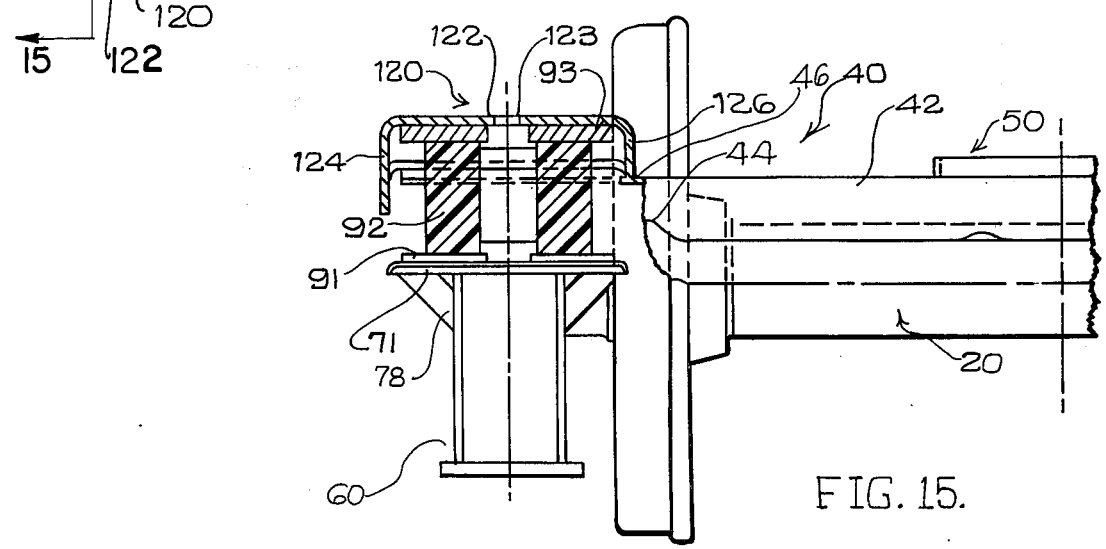
FIG. 15 is a transverse section along the lines 15—15 in FIG. 14 further illustrating the cover assembly for the elastomeric spring assembly.

In the embodiment shown in FIGS. 14 and 15 the spring assembly indicated generally at 120 comprises a cover 122 fitting within bolster openings 46 having spaced sides 124 and 126 welded to bolster portion 44. Cover 122 is adapted to maintain the elastomeric spring 92 in place by engaging top cover plate 93. Cover 122 may have an opening 123 to facilitate air circulation to cool elastomeric spring 92. Again, openings 128 are provided, spaced from side frame extensions 61 as indicated at 129 to provide clearance therebetween.

The spring assembly 80 whether comprising coiled springs indicated generally at 82 or rubber springs indicated generally at 90 provided lateral springing as well as vertical springing to improve the negotiability of the truck over rough track and reduce the speed at which rock of the car becomes serious. Openings 104 and 128 are provided at the bolster guides to allow lateral deflection of the springs. Generally, the spring rate laterally is approximately half of the vertical spring rate.

Elastomeric spring 92 may be provided with a covering 95 (FIG. 11) which tends to contain the elastomer and make it stiffer.

It will be apparent to those skilled in the art that a wide variety of elastomeric spring assemblies may be utilized in the truck of the present invention, of which the foregoing is one example.

Figure 13:
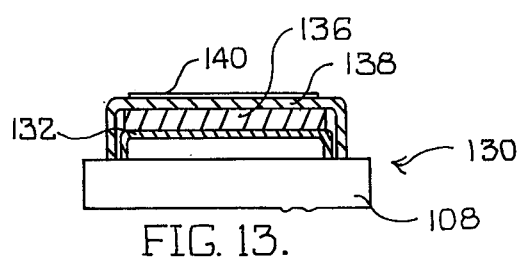
FIG. 13 is a detailed sectional view of the car body bearing assembly of the present invention along the lines 13—13 in FIG. 8.

A car body bearing assembly is indicated in the drawings generally at 130. As shown particularly in FIGS. 9, 13, and 13A, the car body bearing assembly is preferably mounted upon the spring receiving assembly 100. Car body bearing assembly 130 comprises a bearing guide 132, which may be solid or hollow, preferably having reinforcing ribs 134. Mounted thereon is a resilient support preferably comprising an elastomeric member 136. Mounted upon resilient support 136 is a bearing member 138. Mounted upon bearing 138 is a friction reducing member 140 made of a low friction bearing material, such as halogenated polyethylene, for example, tetrafluoroethylene.

A railway car body is indicated generally at 150 in FIG. 16. This car body comprises a center sill 151 having a bottom flange 152 upon which is mounted a center plate assembly 153, and a car body bolster 157. Center plate assembly 153 comprises a center plate support member 154 and a conventional car body center plate 156. The car body may be provided with a conventional side sill 158. Depending from the bolster 157 is a car body side bearing assembly indicated generally at 160. Car body side bearing assembly comprises a side bearing support 162 comprising plates 164 welded to the body bolster and having a side bearing 166 depending therefrom. Side bearing 166 is preferably provided with a covering 168 of low friction material adapted to engage the low friction material 140 mounted on car body bearing assembly 130, to allow the truck 10 to rotate with respect to the car body 150.

A low coefficient of friction material is preferably used as a bearing material at the car support in order that the truck may swivel freely. For example, a filled polytetrafluoroethylene material containing a reinforcing filler, such as mica or glass may be used on the truck in combination with a nylon containing a high molecular weight halogenated polyethylene filler which is melted with the nylon on the car body, as disclosed and claimed in application Ser. No. 559,142, filed Mar. 17, 1975, now Pat. No. 4,001,124, issued Jan. 4, 1977, assigned to a wholly owned subsidiary of the assignee of the present application which application is hereby incorporated into the present application by their reference. This combination results in a coefficient of friction between about 0.1 and about 0.12. In general, the coefficient of friction is preferred to be not more than 0.15 and is most preferably 0.12 or less. The specific materials mentioned herein are intended by way of example only. It is to be understood that other materials which provide a low coefficient of friction may be utilized.

Elastomeric member 136 is provided to allow the bearing surface to rock in order that full surface contact of the car body with the bearing is assured, and to keep foreign material from entering between the contacting surfaces.

A retainer 170 FIGS. 3 and 4 is affixed to the bolster portion 44 and/or cover 101 or 122 with appropriate fasteners 172. Retainer 170 has a lower inward extension 174 which engages side frame top cover plate portion 66a to prevent undue vertical movement of the bolster and separation of the bolster from the main frame. Gussets 178 may be provided, if desired, to reinforce the cover plate portion 66a because this is the area where the resilient assembly and the car body is supported.

Figure 1:
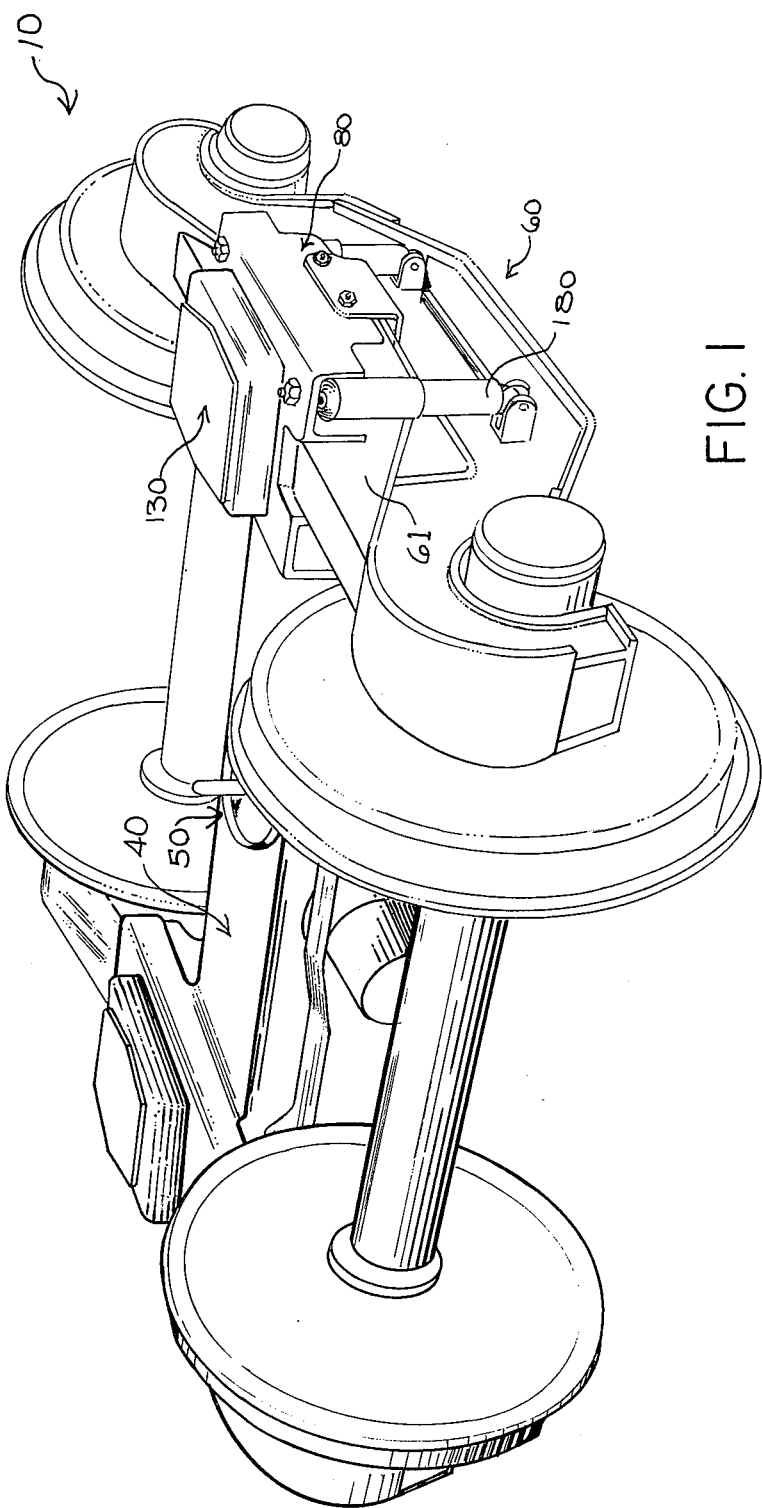
FIG. 1 is a perspective view of the railway car truck of the present invention

Resilient assembly is preferably provided with a pair of dampening devices 180 described in detail in said application Ser. No. 447,823. As pointed out therein, the dampening devices may comprise any of the known shock absorbing constructions. For example, the dampening devices may be hydraulic in nature, pneumatic, or they may operate on a friction principle. Dampening devices 180 may be mounted within the resilient devices they may be mounted outside of the resilient devices as shown in FIGS. 1, 3 and 4. The dampening devices tend to control rock and roll of the car. Hydraulic or pneumatic units preferably are used in order to provide velocity sensitive snubbing — quick, hard impulses from the wheels are resisted at a higher rate than are gentle rolling motions. Thus the truck is more heavily damped during violent movement of the car than during mild motion. One of the advantages of providing this damping is for control of car rock and roll.

The damping devices may be mounted on cover 101 or 122 (integral with the bolster 40) with fasteners 183 and are mounted at the lower portion on side frames 62 by means of a bracket 184 and suitable fasteners 185. As shown in FIG. 3 even with dampening devices 180 in place, openings 65 are not obstructed thereby.

The truck of the present invention is preferably designed so that the weight on the wheel is equal to or greater than the force on the flange, to avoid derailment. Therefore the hereinbefore described torsional flexibility must be related to the spring rate of resilient devices 80 and to some extent to the dampening coefficient of damping devices 180. For example, the damping of damping devices 180 may be from about 5 to 15% of critical damping in the rocking mode of oscillation. This spring rate further ensures that the static height between empty and full loads is not above about 2½ inches.

A brake assembly indicated generally at 190 (FIG. 5) is provided on the inside of the side frame. This assembly preferably comprises bracket members 192 having wear clips 194 which engage the brake system (not shown) and support the same in operative position.

Figure 17:
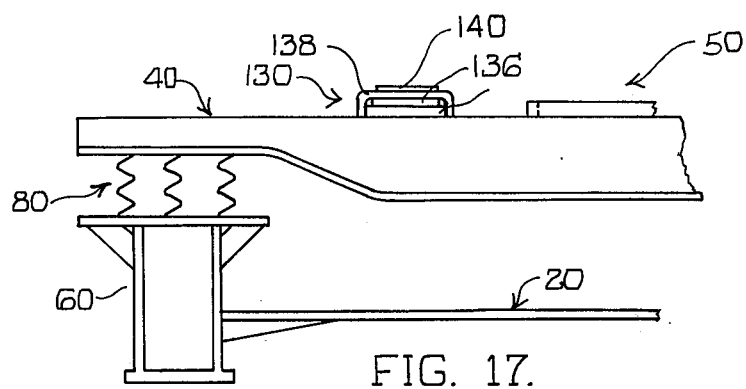
FIG. 17 is a view of an alternative embodiment of the truck of the present invention wherein the car body bearing assembly is located on the bolster intermediate the side frames and the center plate.

Another embodiment of the present invention is shown in FIG. 17. In this embodiment the car body bearing assembly 130 is mounted on the bolster 40 inwardly from side frames 60, closer to the center plate 50. However, it will be apparent from FIG. 17 that the car body bearing assembly is still spaced a considerable distance from the center connection. Preferably car body bearing assembly 130 is mounted approximately half way between the side frames 60 and the center plate 50. A resilient assembly 80 as described herein above supports the bolster 40 upon the side frames.

As described in regard to the previous embodiments, the weight of the vehicle body is taken in the embodiment shown in FIG. 17 at the car body bearing assembly 130. Little or no vertical load is taken in the center plate 50. The weight of the vehicle and the lading is then transmitted through the side frames to resilient devices 80 and then down into the side frames 60.

Mounting the car body bearing assembly inwardly from the side frames reduces the moment arm of the friction material, and makes the truck easier to swivel for any given set of friction materials.

In the operation of the truck of the present invention, the integral H frame construction including transom 20 maintains the truck square. However, the open cross section of transom 20 provides torsional flexibility whereby one wheel may move up or downward with respect to the truck and the remaining wheels will remain generally in engagement with the track. Bolster assembly 40 transmits longitudinal and lateral loads between the car body and the truck, but preferably the shear center is spaced from the vertical axis of the bolster, and thus the bolster does not transmit large torsional loads through the bolster resulting from the transfer of longitudinal loads between the car body and truck. Limited lateral movement between bolster 43 and side frame extensions 61 is permitted by means of clearance therebetween which is preferably from about one-fourth to 1 inch. Resilient assembly 80 cushions vertical and lateral track unevenness, provides rough track negotiability and reduces or avoids derailment tendencies over rough track. Vertical oscillations and rock and roll are damped by dampening devices 180. The weight of the vehicle body is taken by the car body bearing assembly 130 and the truck is free to rotate with respect to the car body by virtue of the use of low friction material 140, preferably also in engagement with low friction material 168 on the car body side bearing assembly 160. However, because the transom maintains the truck square the truck does not hunt at the speeds commonly utilized in railway freight train operation up to about 100 miles per hour or higher.

The truck of the present invention is compatible with standard brake assemblies and wheel set components that are used on commercially available cast trucks. The truck may be assembled from flat and formed plates, from castings or from a combination of cast and formed member.

What is claimed is:

1. A railway truck comprising:
a pair of longitudinally spaced, transversely extending wheel axles having wheels and journal bearings mounted on opposite ends of said axles; a pair of transversely spaced side frames extending longitudinally of said truck each supported by said journal bearings outboard of said wheels; said side frames each having side frame openings at about the midpoint thereof; a vertically compressible spring assembly mounted within each of said side frame openings; a bolster extending transversely between said side frames, with opposite end portions of said bolster in vertical allignment with said side frame openings and supported on said spring assemblies for vertical movement relative to said side frames; a transom extending transversely between said side frames located below said bolster and rigidly affixed at its opposite ends thereof to each of said side frames; said transom connected solely to said side frames maintaining said side frames in parallel relationship and resisting truck hunting; said transom having sufficient torsional flexibility to allow said side frames to rock relative to each other about an axis transverse to said truck; a bolster center bearing located centrally of said bolster adapted to provide a connection of said bolster to a railway car body; a pair of car body bearing assemblies mounted on said bolster, one on each side of said bolster center bearing; said car body bearing assemblies each having an upper surface of low friction material, whereby said truck rotates with respect to said car body by virtue of said low friction material, and whereby the weight of the car body is supported by said car body bearing assemblies and is transferred through said bolster to said spring assemblies, and from said spring assemblies to said side frames and through said bearings and wheel axles to said wheels, and whereby horizontal forces applied to said car body are transmitted through said bolster center bearing through said bolster to said side frames.

2. A railway car truck according to claim 1 wherein means are provided to allow limited transverse movement of said bolster with respect to said side frames.

3. A railway car truck according to claim 2 wherein said spring assembly cushions transverse movement of said bolster.

4. A railway car truck according to claim 2 wherein each of said side frames include longitudinally spaced generally vertical surfaces, which define said side frame openings, and wherein longitudinal clearances exists between said bolster and said vertical surfaces, allowing limited transverse movement of said bolster with respect to said side frames.

5. A railway car truck according to claim 2 wherein stop means are provided to limit transverse movement of said bolster.

6. A railway car truck according to claim 1 wherein transom reinforcement is provided by at least one connection to said side frames at end portions of said transom adjacent said side frames.

7. A railway car truck according to claim 6, wherein said transom reinforcement defines a cross section which decreases in the transverse direction toward the longitudinal center line of the truck.

8. A railway car truck according to claim 1 wherein a car body is provided having a car body center connection which engages said bolster center bearing, and wherein said car body includes a pair of transversely spaced depending car body depending portions each having a lower surface made of low friction matterial which engages respectively said car body bearing assemblies.

9. A railway car truck according to claim 1 wherein said center bearing assembly is vertically spaced from the neutral axis of said bolster cross section.

10. A railway car truck according to claim 9 wherein said bolster cross section comprises a channel section.

11. A railway car truck comprising:
a pair of longitudinally spaced, transversely extending wheel axles with wheels and journal bearings attached to each of said axles at opposite ends thereof; longitudinally extending transversely spaced side frames, each supported by a pair of said journal bearings; each side frame having a side frame opening at about the mid portion thereof; a bolster having a bolster center bearing adapted to engage the center connection of a railway car body; a car body bearing assembly mounted upon said bolster on either side of said bolster center bearing; a transom located vertically below said bolster extending transversely of the truck, and being rigidly attached to each of said side frames to define an integral H frame which resists truck hunting; a dual component spring assembly mounted in each of said side frame openings comprising a first spring component having a resultant relatively high spring rate which supports the car body at all times when ordinary track is traversed; and a second spring component having a resultant relatively low spring rate which functions when rough track is traversed to transmit substantially all of the weight of the vehicle body vertically downwardly into said side frames, said weight being then transmitted into the wheels, thus tending to maintain the wheels on the track while rough track is being traversed.

12. A railway car truck according to claim 11 wherein said spring assembly cushions transverse movement of said bolster in addition to vertical movement of said bolster.

13. A railway car truck according to claim 11 wherein said spring assembly comprises an elastomeric spring.

14. A railway car truck according to claim 11 wherein said spring assembly comprises at least one coil spring.

15. An assembly according to claim 14 wherein said spring assembly comprises a plurality of coil springs in which at least one first coil spring has a resultant relatively high spring rate and a second coil spring has a resultant relatively low spring rate.

16. An assembly according to claim 15 wherein in traversing ordinary track said first and second coil springs act in parallel and wherein in traversing rough track said first coil spring is inactive and said second coil spring transfers the weight of the car body to the side frames.

17. An assembly according to claim 15 wherein in traversing ordinary track said first coil spring transmits the weight of the car body to the side frame, and said second coil springs are inactive and wherein in traversing rough track said second and first coil springs act in series to transmit the weight of the car body to the side frames.

18. A railway car truck according to claim 11 wherein at least one dampening device is connected between said bolster and said side frame effective to damp oscillations of said spring assembly and thus control truck rock and roll.

19. A railway car truck according to claim 11 wherein a resilient pad is located between each side frame and each of said journal boxes.

20. A railway car truck according to claim 11 wherein said elastomeric spring is cylindrically shaped having a generally central opening therein which engages lower and upper cover plates in said spring assembly.

21. A railway car truck according to claim 20 wherein said lower and upper cover plates of said spring assembly are provided with openings whereby air may pass through said elastomeric spring and said cover plates to remove heat from said elastomeric spring.

* * * * *

UNITED STATES PATENT OFFICE
CERTIFICATE OF CORRECTION

Patent No. 4,030,424  Dated June 21, 1977

Inventor(s) Conway H. Melcher et al.

It is certified that error appears in the above-identified patent and that said Letters Patent are hereby corrected as shown below:

On the cover page under Item [19] "Garner et al." should read -- Melcher et al. --.

Item [75] should read
-- Conway H. Melcher; Kirkwood, Gerald D. Garner; Florissant, James C. Hammonds; and Jan D. Holt, both of St. Charles, all of Mo. --.

Column 3, line 44, "rectangular" should read -- railway car --.
line 50, "ghe" should read -- the --.

Column 5, line 9, a comma should be inserted after "section".

Column 6, line 60, -- spring retainers -- should be inserted after "plurality of".

Column 10, line 27, "frame" should read -- frames --.
line 39, should read -- vices or they may be mounted outside of the resilient --.

Signed and Sealed this

Twenty-seventh Day of September 1977

[SEAL]

Attest:

RUTH C. MASON
*Attesting Officer*

LUTRELLE F. PARKER
*Acting Commissioner of Patents and Trademarks*